(12) United States Patent
Dubettier-Grenier et al.

(10) Patent No.: US 7,527,249 B2
(45) Date of Patent: May 5, 2009

(54) FLUID DISTRIBUTOR FOR A MATERIAL AND HEAT EXCHANGE COLUMN, IN PARTICULAR, A PACKED COLUMN AND COLUMN PROVIDED WITH SUCH A DISTRIBUTOR

(75) Inventors: Richard Dubettier-Grenier, La Varenne Saint Hilaire (FR); Philippe Grigoletto, Villeparisis (FR)

(73) Assignee: L'Air Liquide, Societe Anonyme a Directoire et Consell de Surveillance pout l'Etude et l'Exploitation des Procedes Georges Claude, Paris (FR)

( * ) Notice: Subject to any disclaimer, the term of this patent is extended or adjusted under 35 U.S.C. 154(b) by 345 days.

(21) Appl. No.: 10/573,091

(22) PCT Filed: Oct. 14, 2004

(86) PCT No.: PCT/FR2004/050501

§ 371 (c)(1),
(2), (4) Date: Nov. 20, 2006

(87) PCT Pub. No.: WO2005/039726

PCT Pub. Date: May 6, 2005

(65) Prior Publication Data

US 2007/0069405 A1    Mar. 29, 2007

(30) Foreign Application Priority Data

Oct. 20, 2003   (FR)   .................... 03 50708

(51) Int. Cl.
*B01F 3/04*   (2006.01)

(52) U.S. Cl. ..................... 261/96; 261/97; 261/109; 261/110

(58) Field of Classification Search .................. 261/96, 261/97, 102, 105, 109, 110
See application file for complete search history.

(56) References Cited

U.S. PATENT DOCUMENTS

| 5,000,883 | A | * | 3/1991 | Leva ............................ 261/97 |
| 5,107,892 | A | * | 4/1992 | Plachy ..................... 137/561 A |
| 5,132,055 | A | * | 7/1992 | Alleaume et al. ............. 261/97 |
| 5,224,351 | A | * | 7/1993 | Jeannot et al. ................ 62/643 |

(Continued)

FOREIGN PATENT DOCUMENTS

EP   0 434 510   6/1991

(Continued)

OTHER PUBLICATIONS

International Search Report for PCT/FR2004/050501 Apr. 2005.

*Primary Examiner*—Scott Bushey
(74) *Attorney, Agent, or Firm*—Elwood Haynes

(57) ABSTRACT

The invention relates to a fluid distributor for a material and heat exchange column, comprising a series of adjacent parallel vertical walls (11) which define alternate gas and liquid volumes, whereby some of the vertical walls are separated by horizontal bottom walls, provided with a line of holes and at least one section of each vertical wall is provided with a line of openings (12, 12A), formed in the upper part of the vertical wall and whereby first openings (12) have a first length towards the horizontal wall and second openings (12A) have a second length towards the horizontal wall, the second length being greater than the first.

7 Claims, 2 Drawing Sheets

U.S. PATENT DOCUMENTS

| | | | | |
|---|---|---|---|---|
| 5,785,900 A | * | 7/1998 | Belot et al. | 261/97 |
| RE36,577 E | | 2/2000 | Jeannot et al. | |
| 6,294,053 B1 | * | 9/2001 | Darredeau | 202/158 |
| 6,536,233 B2 | * | 3/2003 | Darredeau et al. | 62/643 |

FOREIGN PATENT DOCUMENTS

| | | |
|---|---|---|
| EP | 0 665 042 | 8/1995 |
| GB | 2 046 623 | 11/1980 |
| WO | WO 99 34907 | 7/1999 |

* cited by examiner

FLUID DISTRIBUTOR FOR A MATERIAL AND HEAT EXCHANGE COLUMN, IN PARTICULAR, A PACKED COLUMN AND COLUMN PROVIDED WITH SUCH A DISTRIBUTOR

This application is filed under 35 U.S.C. 371 as a national stage filing of PCT/FR04/50501, which was filed on Oct. 14, 2004, and which claims foreign priority under 35 U.S.C. 199 to French application 0350708, filed Oct. 20, 2003.

The present invention relates to a fluid distributor for a heat and material exchange column, more particularly of the packed column type, and particularly to air distillation columns, of the type comprising a series of alternate gas and liquid spaces, defined by horizontal bottom walls provided with a line of holes and vertical walls provided with a line of openings each having the same dimensions.

A distributor of this type is described in document GB-A-2 046 623, where the distributor is covered with a random packing consisting of bulk elements.

A distributor of the prior art is described in EP-A-0434510.

It is the object of the invention to provide a distributor capable of uniformly distributing the liquid while procuring a good gas distribution. It is particularly suitable for eliminating the chimneys, illustrated in EP-A-0435510.

According to one object of the invention, a fluid distributor is provided for a heat and material exchange column, comprising a series of adjacent parallel vertical walls defining alternate gas and liquid spaces, some of the vertical walls being separated by horizontal bottom walls provided with a line of holes and at least a portion of each vertical wall being provided with a line of openings, each pair of adjacent vertical walls defining a gas space, the line of openings being formed in the upper part of the vertical wall, the horizontal walls being fixed by their ends to a peripheral ring, characterized in that first openings have a first length toward the horizontal wall and second openings have a second length toward the horizontal wall, the second length being greater than the first.

According to other optional aspects:
the first and second openings are elongate, the second openings being more elongate than other openings;
the first and second openings have an oval or rectangular shape;
the line of openings comprises one opening out of N openings which is a second opening, N being an integer higher than 1, and the other openings of the line are first openings arranged between the second openings;
N is between 4 and 6 inclusive, and preferably equal to 5;
the gas spaces are closed at the top.

According to another object of the invention, a heat and material exchange column is provided, characterized in that it comprises at least one distributor as claimed in one of claims 1 to 6.

BRIEF DESCRIPTION OF THE DRAWINGS

An embodiment of the invention will now be described with respect to the drawings appended hereto, in which.

DETAILED DESCRIPTION OF THE PREFERRED EMBODIMENT

Figure 1:
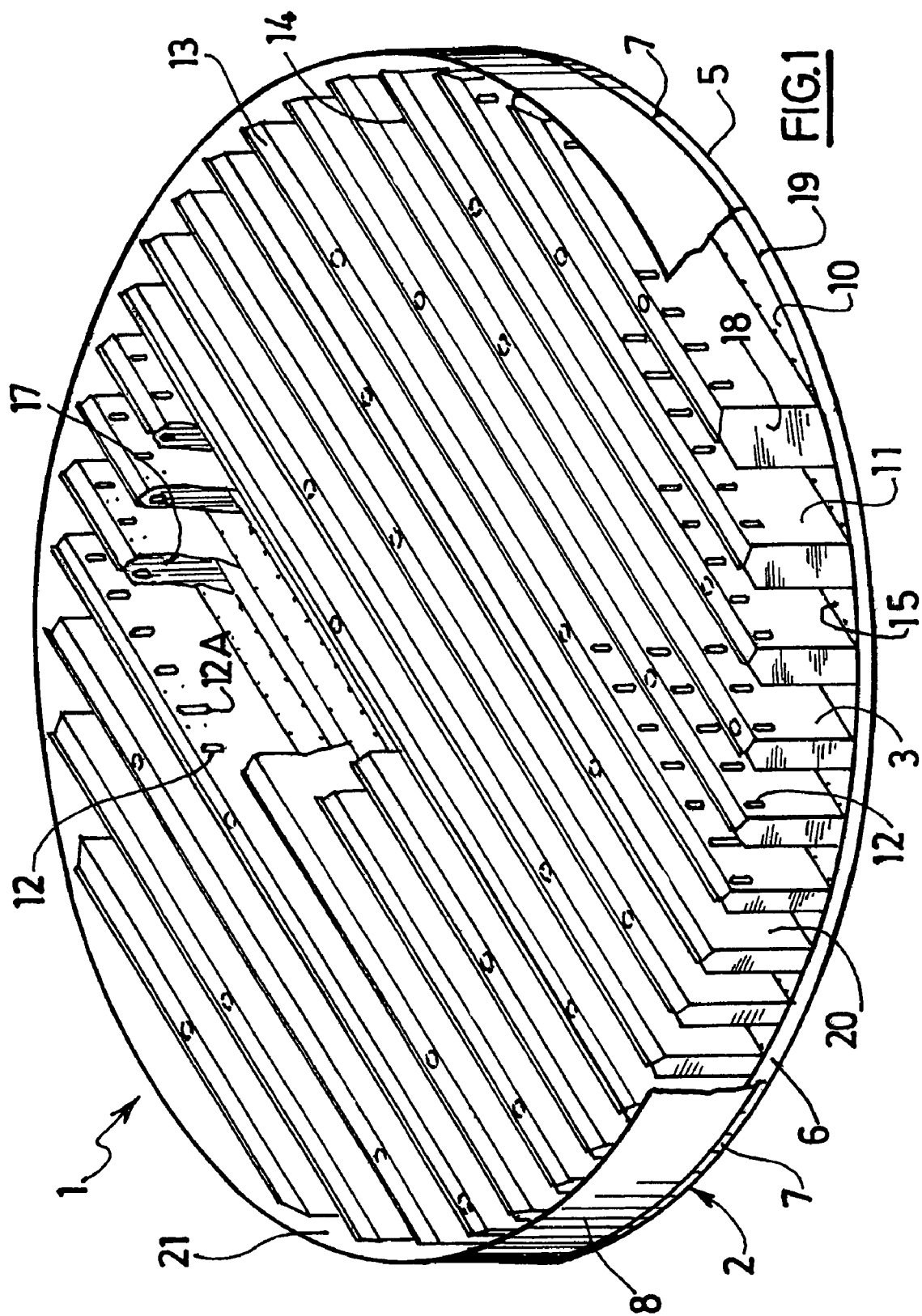
FIG. 1 shows a partially cut-away perspective view of a fluid distributor according to the invention and FIG. 2 shows a side view of a section of the distributor.

The distributor 1 shown in FIG. 1 consists of a peripheral ring 2 and a series of channel sections 3.

The ring 2 itself comprises a circular peripheral angle section 5 comprising a bottom horizontal flange 6 and an upwardly extending outer edge 7. An upwardly projecting cylindrical skirt 8 is hermetically fixed to said edge.

Each section 3 consists of a perforated horizontal bottom 10 bordered by two parallel vertical walls 11. Each wall 11 comprises, along its upper edge, a horizontal line of rectangular openings 12 with a large vertical axis, the openings of one wall 11 being offset by a half-pitch to those of the opposite wall. Only some openings are shown in FIG. 1.

Each wall 11 extends obliquely upward and outward from the section 3 in a half-roof 13 that terminates in a narrow upwardly extending vertical edge 14.

The sections 3 are arranged side by side, so that their half-roofs 13 meet, the adjacent edges 14 being applied against one another along their whole length and being fixed together by appropriate means (not shown) sealed to the liquid but not necessarily gastight, for example, by tack welds or by clips.

Each bottom 10 comprises a line of holes 15 along each wall 11. The two lines are offset by a half-pitch to one another, and the dimensions of the half-roof 13 are such that, in a plan view, the distance d between the lines of holes is the same, whether these lines belong to the same section 3 or to two adjacent sections. Over the whole surface of the distributor, a uniform mesh of holes 15 is thereby obtained, in a plan view, with a diamond shaped mesh.

Moreover, in its longitudinal mid-plane and at regular intervals, substantially greater than the pitch of the holes 15, each bottom 10 comprises a larger diameter opening 16 in which the narrow bottom end of a chimney 4 fits. These chimneys have the shape of a funnel rising to a level slightly lower than that of the bottom edge of the openings 12.

Each section 3 is cut to length, transversally or obliquely, in order to bear via each end on the flange 6 of the ring 2. Each end of each gas space 17 defined between two adjacent sections is hermetically sealed, at least up to the level of the bottom edge of the rectangular openings 12A, by a vertical plate 18 of corresponding shape, welded along its side edges, of which the bottom edge is flush with the internal side of the bottoms 10 and of which the upper edge defines an end gas passage 180.

Most of the openings 12 are rectangular with rounded corners.

One opening out of five 12A is longer than the other openings 12, thereby permitting the liquid to flow from the bottom part of the openings 12A, without hindering the rise of gases through the openings 12. These longer openings 12A are rectangular with rounded corners at the top and square corners at the bottom.

The bottom edges of the plates 18 and the ends of the bottoms 10 are welded to the flange 6 by a continuous hermetic weld 19.

The distributor thus defines a number of spaces 20 for collecting liquid bounded by a bottom 10 and the two vertical walls 11 of the same section, these spaces 20 alternating with the abovementioned gas spaces 17, which are gas passages. The distributor also defines a peripheral channel 21, bounded by the edge 7 and the skirt 8 of the ring 1 and communicating with all the spaces 20.

The distributor 1 is designed to be mounted in a heat and material exchange column, for example an air distillation column, of the stacked packing type, particularly with cross-corrugated packing, as described in the abovementioned document WO 89/10527. A column of this type is divided into a number of sections, each of which is equipped with a packed section respectively. In the case of a cross-corrugated packing, each section comprises a stack of obliquely corrugated vertical plates, the corrugations of the adjacent blades being inclined in the opposite direction.

In operation, the liquid falls from the whole surface of the upper section and is collected in the liquid spaces 20 and in the channel 21, thereby equalizing the liquid level in all the spaces 20. The liquid is then distributed uniformly to the lower pack thanks to the regular mesh of the holes 15.

At the same time, the rising gas enters the gas spaces 17 and leaves them via the openings 12, 12A above the liquid level. Depending on the relative diameters of the distributor and the upper pack, it may be necessary:

- to let the gas exit through the ends of the spaces 17, by limiting the height of the plates;
- or to completely seal the ends of the spaces 17 by means of these plates;
- or not only to effect this seal, but also to eliminate the openings 12 close to the ends of the sections 3.

The gas is thereby also distributed more or less uniformly over the whole column cross section, without excessive pressure drop across the distributor. Thanks to the fact that the openings 12, 12A are provided in the vertical walls 11, and also thanks to their rectangular shape, these openings offer an extended total area to the passage of the gas, without hindering the fall of the liquid over the whole surface of the distributor and without substantially reducing the mechanical inertia of the walls 11.

The distributor may also be constructed according to the techniques of EP-A-0736314 or other techniques.

Figure 2:
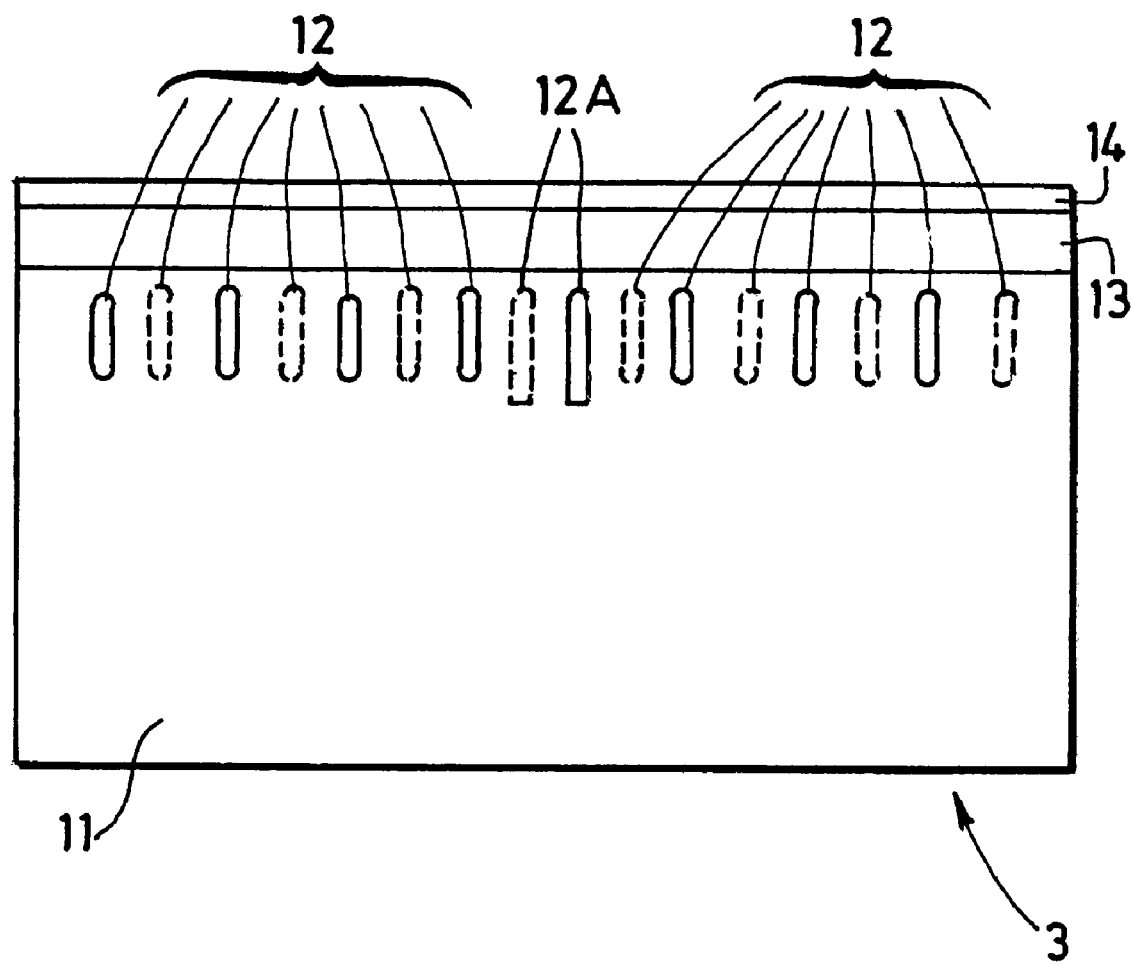

FIG. 2 shows the wall 11, with its half-roof 13 and the edge 14. A line of openings 12, 12A stretches along the whole upper part of the wall. The openings 12, 12A of the vertical wall behind this wall are shown by a dotted line and are offset by a half-pitch to those of the wall placed in front. The first openings 12 of reduced length are grouped in fours, each grouping of the first openings 12 being separated by a second opening 12A about 20 and 30% longer than the first openings.

Preferably, a first opening 12 of reduced length is located at the start and end of a line.

The invention claimed is:

1. A fluid distributor for a heat and material exchange column, comprising a series of adjacent parallel vertical walls defining alternate gas and liquid spaces, some of the vertical walls being separated by horizontal bottom walls provided with a line of holes and at least a portion of each vertical wall being provided with a line of openings, each pair of adjacent vertical walls defining a gas space, the line of openings being formed in the upper part of the vertical wall, the horizontal walls being fixed by their ends to a peripheral ring, characterized in that first openings have a first length toward the horizontal wall and second openings have a second length toward the horizontal wall, the second length being greater than the first.

2. The distributor as claimed in claim 1, in which the first and second openings are elongate, the second openings being more elongate than other openings.

3. The distributor as claimed in claim 2, in which the first and second openings have an oval or rectangular shape.

4. The distributor as claimed in claim 1, in which the line of openings comprises one opening out of N openings which is a second opening, N being an integer higher than 1, and the other openings of the line are first openings arranged between the second openings.

5. The distributor as claimed in claim 4, in which N is between 4 and 6 inclusive, and preferably equal to 5.

6. The distributor as claimed in claim 1, in which the gas spaces are closed at the top.

7. A heat and material exchange column, characterized in that it comprises at least one distributor as claimed in claim 1.

* * * * *